United States Patent

Asai

[11] Patent Number: 5,812,980
[45] Date of Patent: Sep. 22, 1998

[54] PROGRAM OPERATING APPARATUS

[75] Inventor: Toshinori Asai, Ohta-ku, Japan

[73] Assignee: Sega Enterprises, Ltd., Tokyo, Japan

[21] Appl. No.: 389,249

[22] Filed: Feb. 16, 1995

[30] Foreign Application Priority Data

Feb. 22, 1994 [JP] Japan .................................. 6-049899
Feb. 28, 1994 [JP] Japan .................................. 6-055303

[51] Int. Cl.$^6$ .................................................. G06F 161/00
[52] U.S. Cl. ............................ 705/1; 380/3; 380/23
[58] Field of Search .................................. 364/401, 419;
235/380, 379; 340/798, 799; 380/3, 4, 23,
5, 30, 60; 705/1; 707/536; 704/1, 2, 8

[56] References Cited

U.S. PATENT DOCUMENTS

| | | | |
|---|---|---|---|
| 4,471,163 | 9/1984 | Donald et al. | 340/825.34 |
| 4,609,777 | 9/1986 | Cargile | 364/200 |
| 4,812,628 | 3/1989 | Boston | 235/380 |
| 5,134,391 | 7/1992 | Okkada | 340/799 |
| 5,134,648 | 7/1992 | Hochfield et al. | 379/98 |
| 5,151,694 | 9/1992 | Yamasaki | 340/825.44 |
| 5,428,772 | 6/1995 | Merz | 395/600 |
| 5,436,436 | 7/1995 | Matsukawa | 235/380 |
| 5,440,615 | 8/1995 | Caccuro et al. | 379/67 |
| 5,450,489 | 9/1995 | Ostrover et al. | 380/5 |
| 5,486,899 | 1/1996 | Iimori et al. | 355/203 |
| 5,488,410 | 1/1996 | Lieberfarb et al. | 380/5 |
| 5,500,513 | 3/1996 | Langhans | 235/380 |

Primary Examiner—Frantzy Poinvil
Attorney, Agent, or Firm—Price, Gess & Ubell

[57] ABSTRACT

A program operating apparatus comprises a body unit and a memory unit, attachable to and detachable from the body unit, for storing an application program. The memory unit stores sales area data indicating sales areas of the memory unit. The body unit stores sales area data indicating sales areas of the body unit. When executing software of the memory unit, there are checked the sales area data of this memory unit and the sales area data of the body unit. Thus, the memory unit sold in areas exclusive of the sales areas of the body unit is prevented from operating on that body unit. Similarly, the body unit sold in areas exclusive of the sales areas of the memory unit prevents an execution of the memory unit.

18 Claims, 10 Drawing Sheets

| AREA | AREA CODE |
|---|---|
| JAPAN | 0 |
| NORTH AMERICA | 1 |
| EUROPE | 2 |
| SOUTHEAST ASIA PAL | 3 |
| SOUTHEAST ASIA NTSC | 4 |

PROGRAM OPERATING APPARATUS

BACKGROUND OF THE INVENTION

1. Field of the Invention

The present invention relates to a program operating apparatus, the arrangement being such that a storage unit for storing an application program is attachable to and detachable from a body unit.

2. Related Background Art

A program operating apparatus such as a video game apparatus, a personal computer, etc. is widely known. In this type of program operating apparatus, it is desirable that a variety of application programs be executed. Therefore, a memory unit for storing the application programs is attachable to and detachable from a body unit.

For example, in a video game apparatus, the memory unit such as a memory cassette, an optical disc, etc. stores a game program. Then, this memory unit is attachable to and detachable from the body unit. In such an apparatus, it is desirable that the memory unit and the body unit be set in a proper corresponding relationship.

In the conventional program operating apparatus, some of the memory units such as the memory cassette or the like store an issuance approval code. Based on this method, the issuance approval code of the memory unit is checked on the body unit side, thereby confirming that the memory unit is sold by a legitimate issuer. According to this method, it is possible to prevent an unauthorized use of a memory unit.

There arise, however, the following problems inherent in the prior art.

First, the memory unit (software) sold in a certain area is available at a proper price for that area. For example, the selling price of the software differs in Japan, North America and Southeast Asia in some cases. For this reason, if the third party other than the sales company purchases the memory unit in a low-price area and sells this unit in a high-price area, some profit can be obtained. This is unprofitable to the developing company and the sales company of the software.

Second, it may often happen that a selling period of the software differs in the respective areas. In this case also, if the third party exclusive of the sales company purchases the software in the sales area and sells it in a non-sales area, the third party can obtain a profit.

Third, if the software is created in consideration of a characteristic of a local area, there is such an intention that the software does not operate in areas other than that local area in some cases.

Further, a content of the application program of the memory unit is desired to be displayed in a desired language. It is also required that the game program be developed in a world-wide visual field. Therefore, it is desired that the single program corresponds to a variety of languages. For this reason, the message can be displayed in the plurality of languages in the program.

Such a program includes the message data expressed in the respective languages. This program is capable of selecting the language by which the message is to be displayed as an environmental condition. Thus, the game message is displayed in the selected language. Based on the prior art, the language selected in the program is cleared together with an end of this program.

According to this prior art, however, if the program for a game or the like is used in a self-desired language, it is required that the desired language be selected each time the program is started, and this may be a troublesome problem. Further, when starting other programs also, a desired language is required to be chosen, and this is too time-consuming.

SUMMARY OF THE INVENTION

It is a primary object of the present invention to provide a program operating apparatus for preventing software from operating in areas exclusive of sales areas.

It is another object of the present invention to provide a program operating apparatus for preventing an illegal sale by a third party.

It is still another object of the present invention to provide a program operating apparatus for protecting profits of a software developing company and a software sales company.

It is a further object of the present invention to provide a program operating apparatus for operating each program in a selected language.

It is a still further object of the present invention to provide the program operating apparatus for saving a labor required for selecting a language each time the program is started.

To accomplish the objects given above, according to one aspect of the present invention, there is provided a program operating apparatus for operating a program, comprising: a body unit; and a memory unit, attachable to and detachable from the body unit, for storing an application program and sales area data indicating sales areas. The body unit includes a storing element for storing sales area data indicating sales areas of the body unit, a non-volatile memory for storing a basic program and a processor for determining whether or not the application program is executable by comparing the sales area data of the memory unit with the sales area data of the storing element with an execution of the basic program.

According to this aspect of the present invention, the memory unit stores sales area data indicating the sales areas of the memory unit. On the other hand, the body unit stores sales area data indicating the sales areas of the body unit. Then, when executing the software of the memory unit, the sales area data of the memory unit and the sales area data of the body unit are checked.

If done in this way, the memory unit sold in the area exclusive of the sales areas of the body unit is prevented from operating in that body unit. Similarly, the body unit sold in the area exclusive of the sales areas of the memory unit prevents an execution of that memory unit. The sales area data can thus be used as an authorization indicator or code to prevent unauthorized use.

It is therefore feasible to make it meaningless to sell the memory unit and the body unit in other areas that were purchased in a certain sales area. Thus, the third party is prevented from obtaining an illegal profit, whereby the profits of the developing company and of the sales company can be protected.

Next, a check program is provided on the side of the body unit. If this check program is incorporated into the memory unit, it can be also considered that this check program is invalidated by reverse engineering the software of the memory unit. According to the present invention, however the check program is provided as a part of the basic program of the body unit, and, hence, the invalidation due to the reverse engineering analysis can be prevented.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
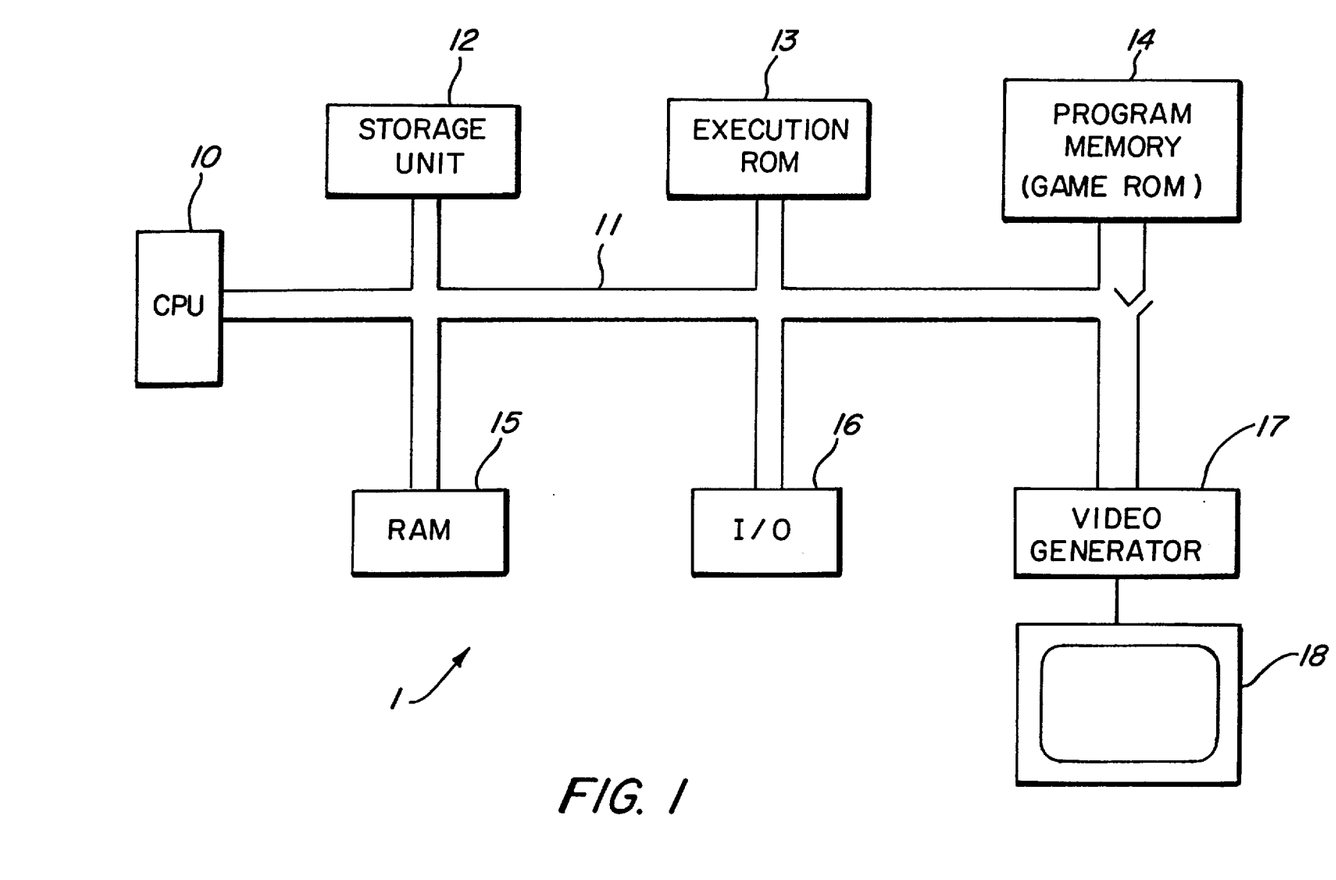
FIG. 1 is a block diagram in one embodiment of the present invention.
Figure 2A:
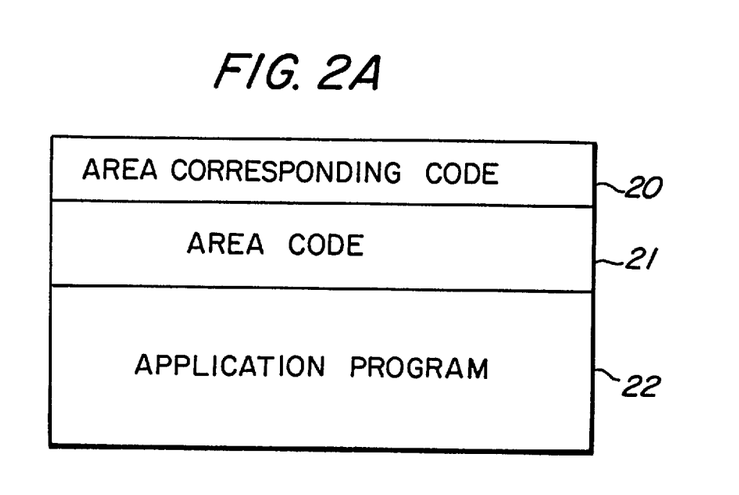
FIGS. 2A and 2B are diagrams of assistance in explaining sales area data in one embodiment of the present invention.
Figure 2B:
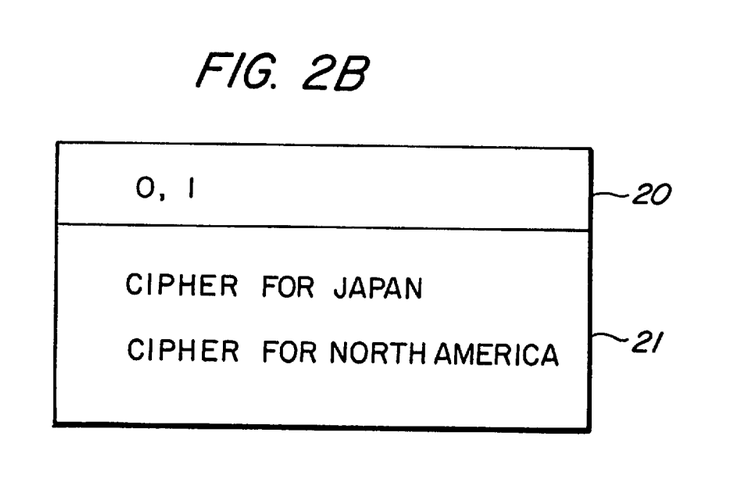
Figure 3:
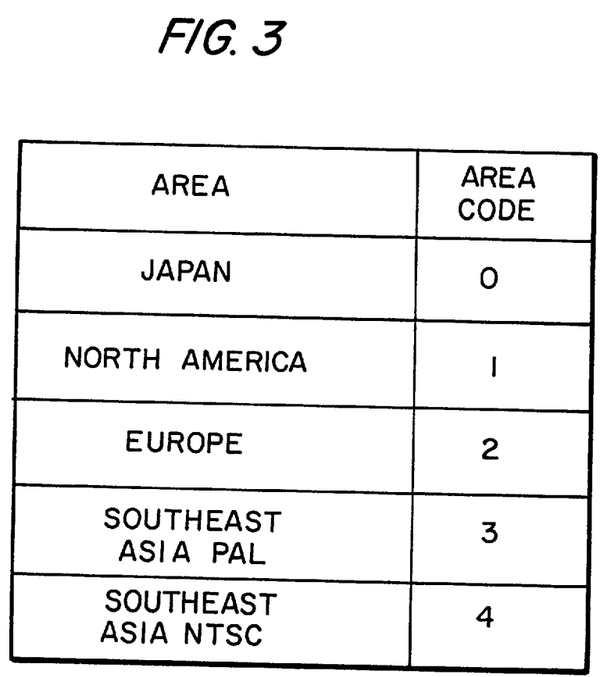
FIG. 3 is a diagram of assistance in explaining sales area codes of FIG. 1.
Figure 4:
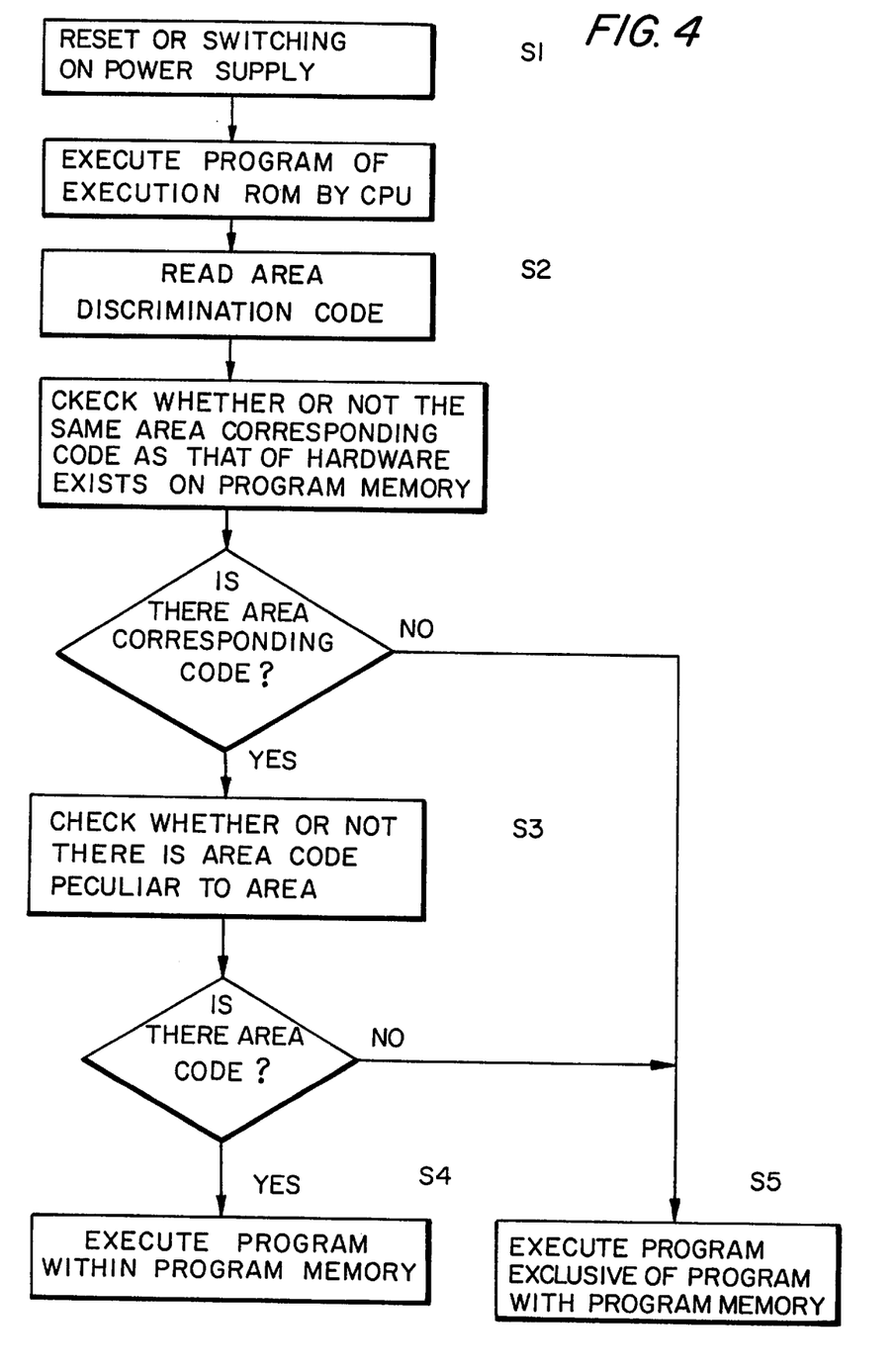
FIG. 4 is a processing flowchart in one embodiment of the present invention.

FIG. 1 is a block diagram illustrating one embodiment of the present invention. FIGS. 2A and 2B are diagrams of assistance in explaining an item of sales area data of FIG. 1. FIG. 3 is a diagram of assistance in explaining sales area codes of FIG. 1. FIG. 4 is a processing flowchart in one embodiment of the present invention.

As illustrated in FIG. 1, a game body unit 1 includes a CPU (processor) 10, a bus 11, a storage unit 12, an execution ROM (read-only memory) 13, a RAM (random access memory) 15, an I/O unit 16 and a video generator 17.

The CPU 10 reads programs from the execution ROM 13 and the program memory 14 via the bus 11 and executes these programs. The storage unit 12 is constructed of a non-volatile memory such as an S-RAM (static RAM) and a RAM backed up by a battery. This storage unit 12 stores discrimination data (area discrimination codes) peculiar to the areas where the body units 1 are sold.

The execution ROM 13 stores a basic program such as a boot program or the like executed by the CPU 10. This basic program includes a check program which will be explained in FIG. 4. The RAM 15 stores data needed for the execution by the CPU 10.

The I/O unit 16 is constructed of, e.g., a game oriented input unit. The video generator 17 converts the data given from the CPU 10 into video signals. Then, the video generator 17 outputs the video signals to a TV (display unit) 18 connected thereto.

The program memory 14 is a memory unit attachable to and detachable from the body unit 1. This program memory 14 is constructed of a memory device such as a ROM, a possible-of-back-up RAM, a floppy disc, a magnetic tape, a magnetic card, an optical card, an optical disc and a magneto-optic disc. When using the floppy disc, the magnetic tape, the magnetic card, the optical card, the optical disc and the magneto-optic disc, a drive mechanism thereof is connected to the bus 11. In this example, a CD-ROM (optical disc) is employed.

As illustrated in FIG. 2A, the program memory 14 has a first area 20 for storing area corresponding codes, a second area 21 for storing area codes and a third area for storing an application program such as a game program, etc.

The area corresponding codes stored in the first area 20 are codes of the area where the programs are sold. For example, as shown in FIG. 3, the sales areas are predetermined in such a way that Japan is marked with a number [0], North America is marked with [1], Europe is marked with [2], PAL area in Southeast Asia is marked with [3], and NTSC area of Southeast Asia is marked with [4]. In the example of FIG. 2B, [0] and [1] for Japan and North America are stored, and, therefore, this indicates that the memory units 14 were sold in Japan and North America.

The area codes stored in the second area 21 are conceived as a program or data peculiar to the sales area. In the example of FIG. 2B, the enciphered codes are employed. That is, if the memory units 14 are sold in Japan and America, there are stored ciphers for Japan and North America. Further, some of the programs entail an indication that this program is used for such and such an area. This program is an object for checking and is, if a result of checking is good, to be executed.

The application program stored in the third area 22 is conceived as a game program which is to be executed by the CPU 10.

The above storage unit 12 stores the sales areas, indicated by the area codes shown in FIG. 3, of the body units 1 and also stores the cipher codes of the sales areas of the body units 1.

Such a sales area checking process will be explained with reference to FIG. 4.

(S1) When switching ON a power supply of the body unit 1 or when a reset signal is generated from the I/O unit 16, the CPU 10 starts executing the basic program within the execution ROM 13.

(S2) The CPU 10 reads the area discrimination codes from the storage unit 12. Next, the CPU 10 reads the area corresponding codes from the program memory 14 and compares the area discrimination code with the area corresponding code. That is, the CPU 10 determines whether or not the area discrimination code is included in the area corresponding code.

(S3) If the area discrimination code of the body unit 1 coincides with the area corresponding code in the program memory 14, the processing moves to a check of the area code. That is, the CPU 10 reads the area discrimination cipher code from the storage unit 12. Next, the CPU 10 reads the area code from the program memory 14 and compares the area code with the area discrimination cipher code. Namely, the CPU 10 determines whether or not the area code is included in the area discrimination cipher code.

(S4) When taking the coincidence of the area discrimination cipher code of the body unit 1 with the area code (area corresponding cipher code) in the program memory 14, the CPU 10 starts executing the game program of the program memory 14. Thus, the game is started.

(S5) On the other hand, if the codes do not correspond in steps S3 or S4, the CPU 10 executes a program other than the game program in the program memory 14. The executed program is, e.g., a program for causing the television 18 to display an indication that this program memory is unusable.

In this way, the correspondence of the sales area in the program memory to the sales area of the body unit 1 is checked before executing the application program of the program memory 14, and, hence, the execution of the game program for a different sales area is inhibited. It is therefore possible to prevent such an act that the third party obtains a profit by purchasing the game program in a low-price sales area and selling the program in a high-price sales area.

Similarly, it is feasible to prevent such an act that the third party obtains the profit by purchasing the game program in the sales area and selling the program in a non-sales area. This makes it possible to protect the profits of the game program developing company and the sales company.

Further, the checking is conducted at two stages involving the use of the area discrimination code and the area discrimination cipher code, and hence an illegal act of falsifying the codes by analyzing the program memory 14 can be more effectively prevented than before. Further, the code checking is performed based on the basic program of the body unit 1, and it is therefore feasible to prevent an invalidation of a check routine with a change of the program in the program memory 14.

Besides, since a plurality of areas can be set, the software common to the plurality of areas can be created. For this reason, it is possible to freely cover the sales areas by an intention of a software creator.

In the embodiment discussed above, the two kinds of codes, i.e., the area discrimination code and the area code are stored, and, then, the two-stage checking is carried out. However, one-stage checking may be effected by storing one kind of code. Moreover, three-stage checking may also be performed by storing three or more kinds of codes. Additionally, in the above-described embodiment, the game program has been explained by way of an application program. However, the present invention is not confined to the game program but is applicable to other application programs. Furthermore, the body unit 1 has been described in the form of the game apparatus. The present invention is, however, applicable to other program operating apparatuses such as a personal computer, etc.

Next, a language selecting process of the application program will be discussed.

Figure 5:
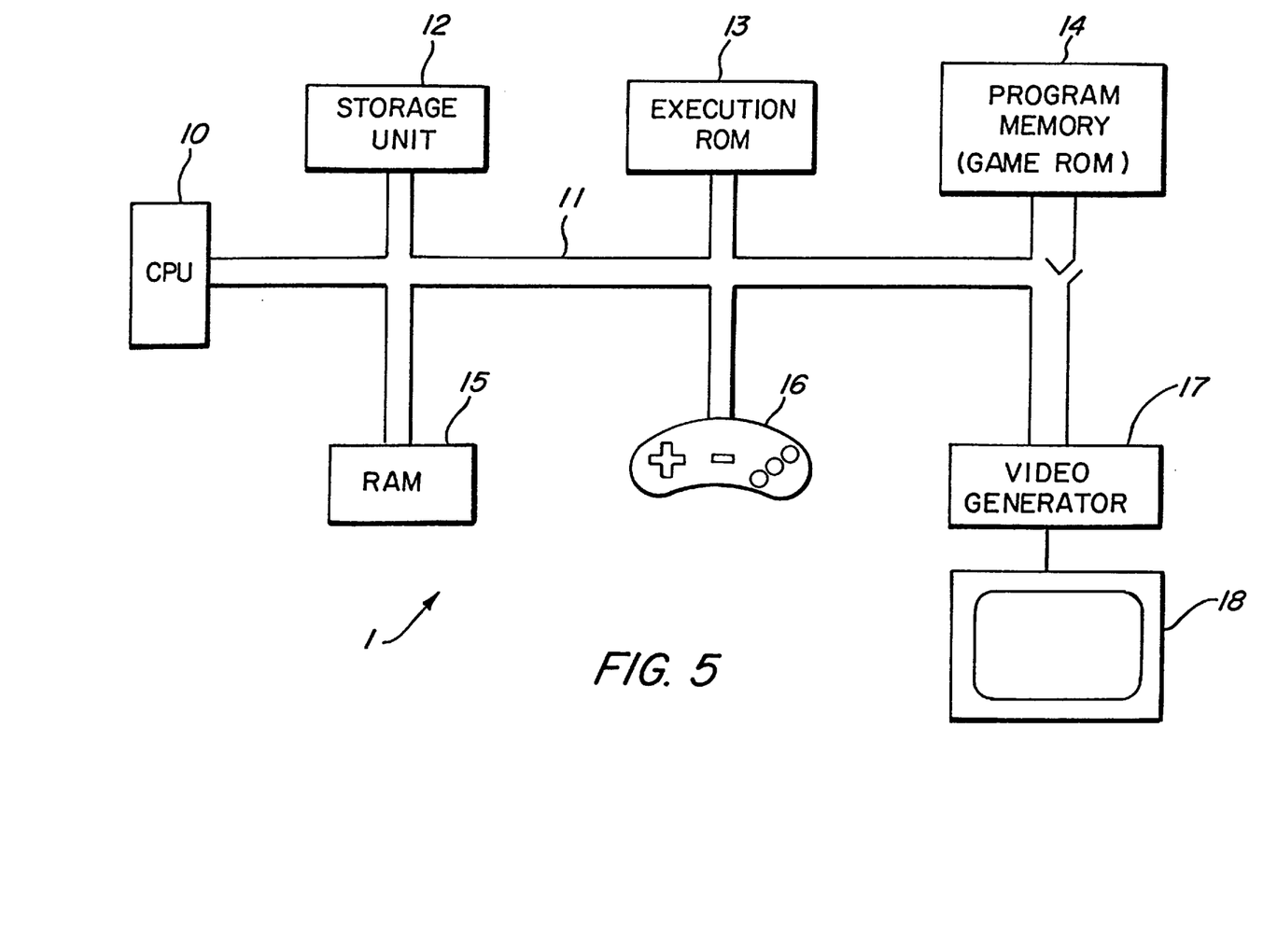
FIG. 5 is a block diagram illustrating another embodiment of the present invention.
Figure 6:
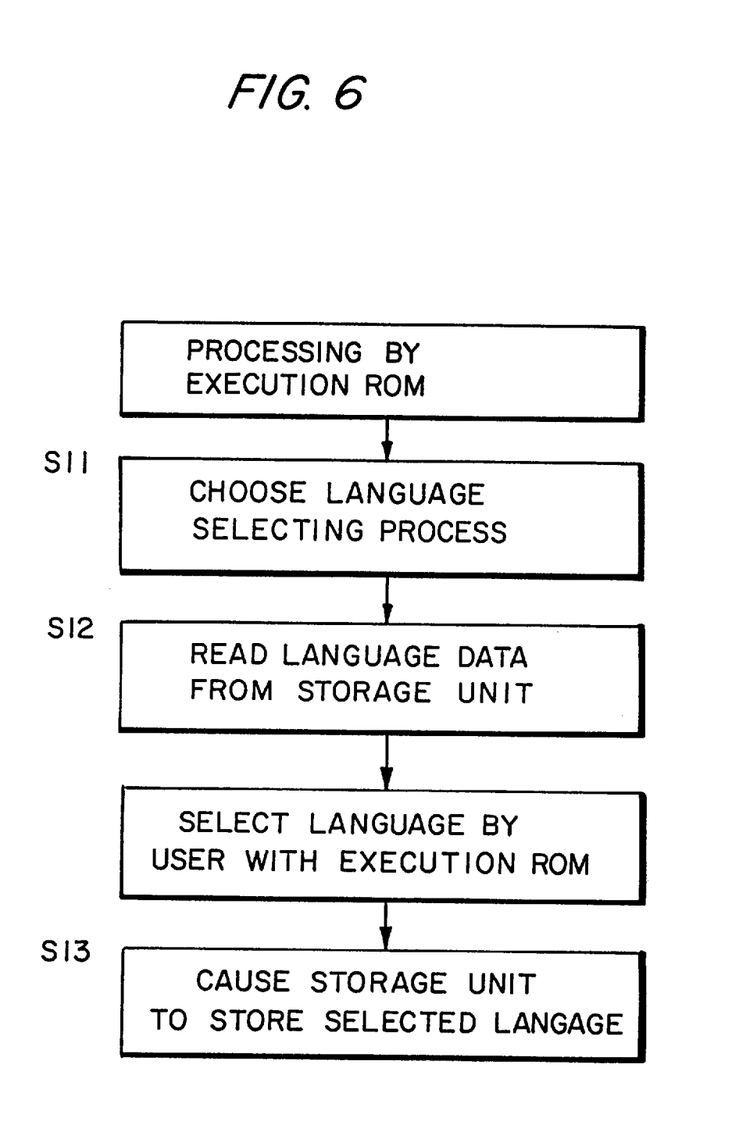
FIG. 6 is a flowchart of a language selecting process in another embodiment of the present invention.
Figure 7:
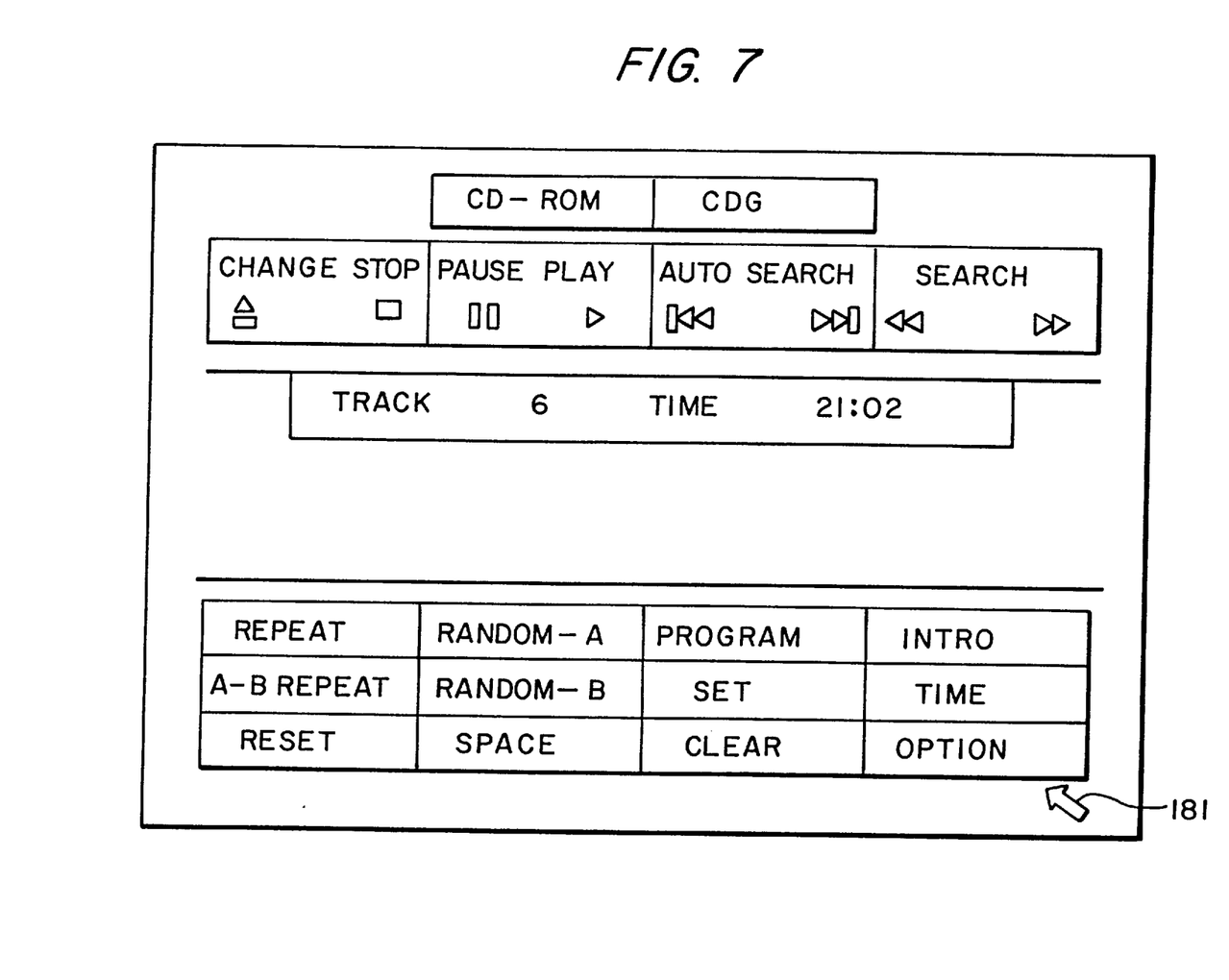
FIG. 7 is an explanatory diagram showing an initial screen of FIG. 6.
Figure 8A:
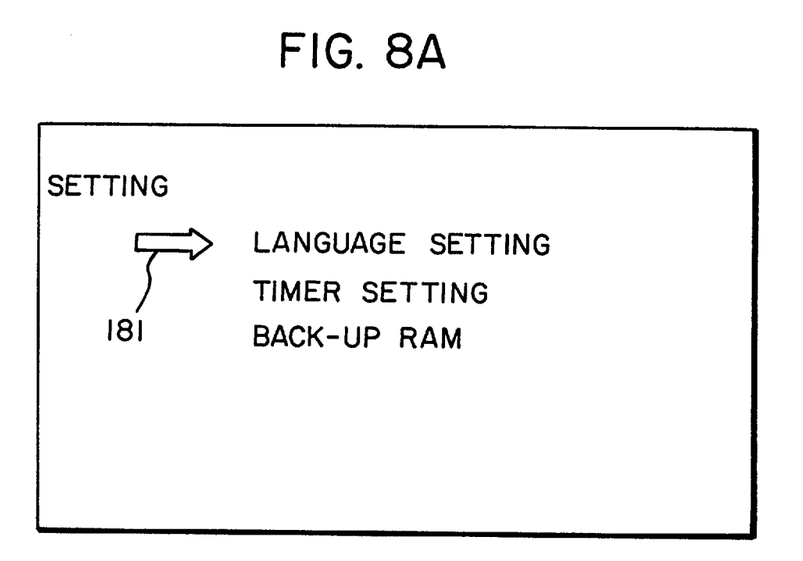
FIGS. 8A and 8B are explanatory diagrams illustrating a language selection screen of FIG. 6.
Figure 8B:
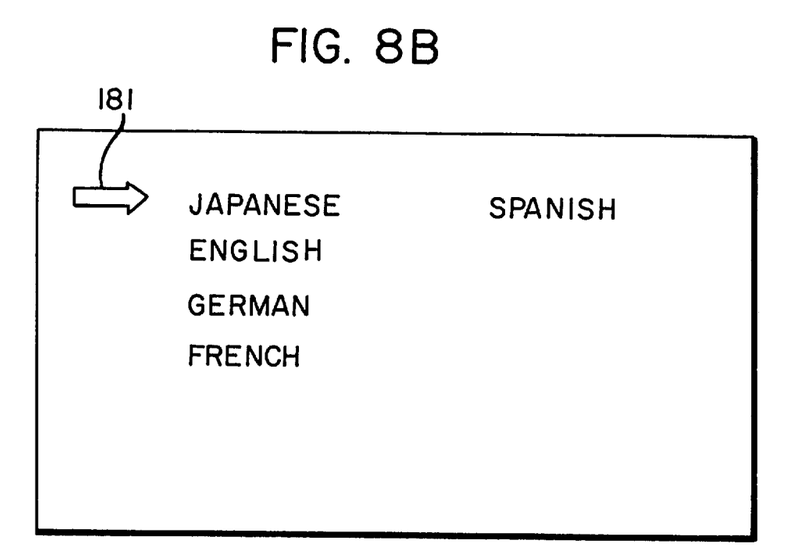
Figure 9:
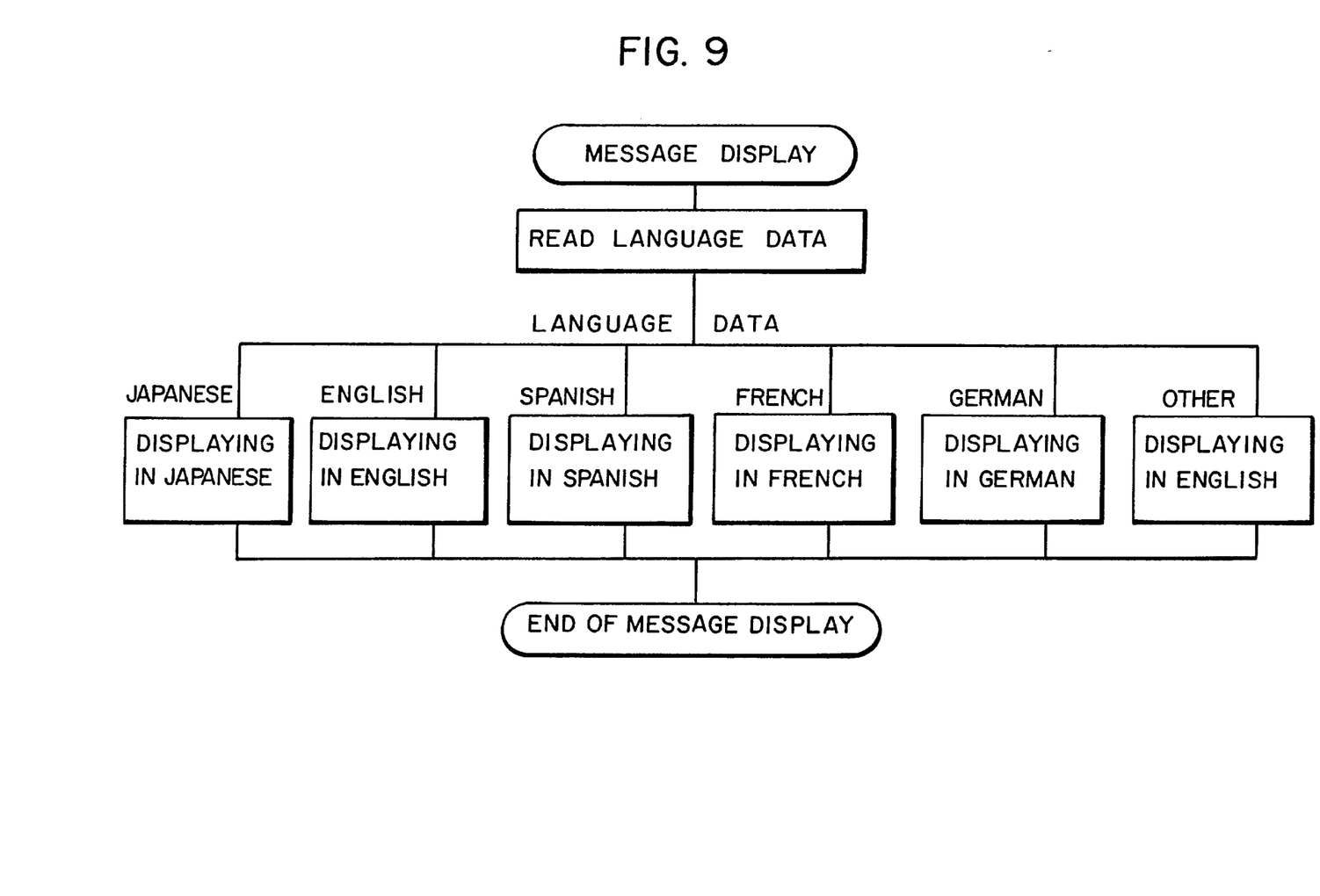
FIG. 9 is a flowchart of a message displaying process in another embodiment of the present invention.
Figure 10:
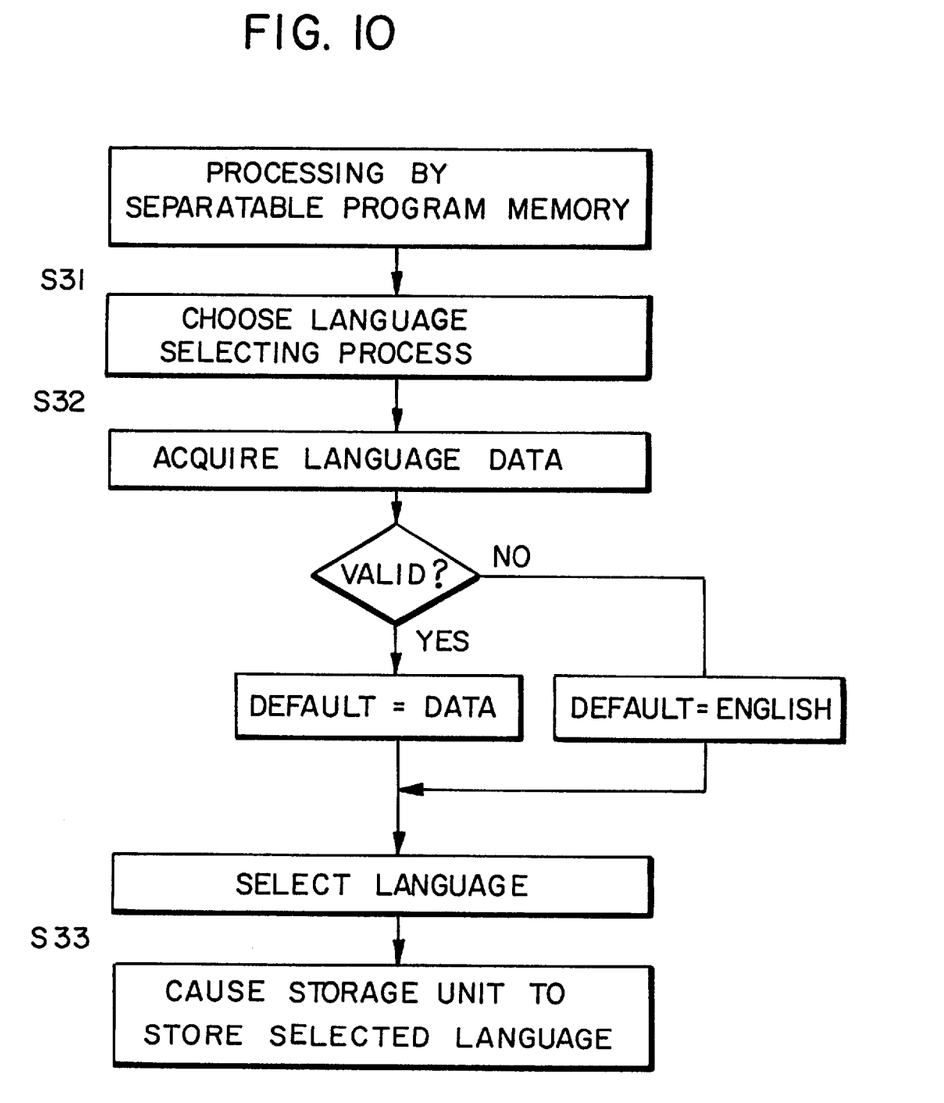
FIG. 10 is a flowchart of a language selecting process in still another embodiment of the present invention.

FIG. 5 is a block diagram showing another embodiment of the present invention. FIG. 6 is a flowchart of the language selecting process by the execution ROM in another embodiment of the present invention. FIG. 7 is an explanatory diagram showing an initial screen in the process of FIG. 6. FIGS. 8A and 8B are explanatory diagrams showing a language selection picture in the process of FIG. 6. FIG. 9 is a flowchart showing a message displaying process in one embodiment of the present invention. FIG. 10 is a flowchart showing the language selecting process by the program memory in still another embodiment of the present invention.

Referring to FIG. 5, the same elements shown in FIG. 1 are marked with the like numerals. As illustrated in FIG. 5, the game body unit 1 includes the CPU (processor) 10, the bus 11, the storage unit 12, the execution ROM (read-only memory) 13, the RAM (random access memory) 15, the I/O unit 16 and the video generator 17.

The above CPU 10 reads programs from the execution ROM 13 and the program memory 14 via the bus 11 and executes these program. The above storage unit 12 is constructed of the non-volatile memory such as the S-RAM (static RAM) and the RAM backed up by the battery. This storage unit 12 also stores an item of selected language data.

The execution ROM 13 stores the basic program such as the boot program or the like executed by the CPU 10. This basic program includes a language selection program which will be explained in FIG. 6. The RAM 15 serves to store data needed for the execution by the CPU 10.

The I/O unit 16 is constructed of a joy pad unit. This joy pad unit 16 inputs an indication to the CPU 10 by a manual operation. This joy pad unit 16 includes a direction indicating button 160 for indicating a direction, a start button 161 for giving a start indication and mode buttons 162, 163, 164.

The video generator 17 converts the data given from the CPU 10 into the video signals. Then, the video generator 17 outputs the video signals to the TV (display unit) 18 connected thereto.

The program memory 14 is the memory unit attachable to and detachable from the body unit 1. This program memory 14 is, as explained above, constructed of the memory device such as the ROM, the possible-of-back-up RAM, the floppy disc, the magnetic tape, the magnetic card, the optical card, the optical disc and the magneto-optic disc. When using the floppy disc, the magnetic tape, the magnetic card, the optical card, the optical disc and the magneto-optic disc, the drive mechanism thereof is connected to the bus 11. In this example, the CD-ROM (optical disc) is employed.

This program memory 14 stores the game program as an application program. Then, the application program has plural pieces of message data wherein messages having the same content are described in different languages.

The language selecting process by the execution ROM 13 will be explained with reference to FIG. 6.

(S11) To start with, a language selecting process is chosen. The processor 10 causes, when in an initial state, the display unit 18 to display an initial screen shown in FIG. 7 with an execution of the program in the execution ROM 13. On the initial screen, a selection item is indicated by a cursor 181. The cursor 181 freely moves on the screen with the aid of a direction indicating button 160 of the joy pad unit 16.

For example, the cursor 181 is located at [CD-ROM], and, when depressing a start button 161 of the joy pad unit 16, the game program of the CD-ROM (program memory) 14 is started.

In the case of picking up the language selecting process, as illustrated in FIG. 7, the cursor 181 is located at [OPTION], and the mode button (selection button) 162 is pushed. With this operation, a set screen shown in FIG. 8A is displayed on the display unit 18. This set screen is a screen for selecting [LANGUAGE SETTING], [TIMER SETTING] and [PROCESSING OF BACK-UP RAM].

Next, the cursor 181 is located at [LANGUAGE SETTING], and, when the mode button 162 is depressed, a language setting mode (language selecting process) is chosen.

(S12) With this processing, the CPU 10 reads the language data from the storage unit 12. Simultaneously with this, the CPU 10 causes the display unit 18 to display the language selection screen shown in FIG. 8B. In this example, there are displayed languages such as Japanese, English, German, French and Spanish.

On this screen wherein the above-mentioned read language data serves as a default value, the cursor 181 is initially displayed in a language position corresponding to this item of language data. Thus, the selected language data is displayed. Note that if the storage unit 12 does not store the language data, for example, English is set as the default value.

The user manipulates the direction indicating button 160 of the joy pad unit 16, thereby locating the cursor 181 in a desired language position. Then, when depressing the mode button 162, a desired language is chosen.

(S13) With this processing, the CPU 10 causes the storage unit 12 to store this selected language data and an effective flag.

Thus, the selecting operation of the language data by the execution ROM 13 is finished.

Next, a message displaying process will be explained with reference to FIG. 9. The display process is defined as a message display subroutine. The display subroutine, read from the application program, thus effecting the message displaying process. That is, in step S4 shown in FIG. 4, when executing the application program, the message displaying process is to be performed.

(S21) When the message displaying process routine is selected, the processor 10 reads the language data out of the storage unit 12.

(S22) The processor 10 selects the massage data in a language corresponding to the language data among pieces of message data of the application program and then displays a message. Namely, if the language data is set to Japanese, the message data in Japanese is selected, and then the message is displayed in Japanese. Similarly, if the language data is set to English, the message data in English is chosen, and the message is displayed in English. Further, with respect to the language data, if the effective flag is invalid, the message is displayed in English as the default value.

The message is thereby displayed based on the language data of the storage unit 12 for storing the language data.

FIG. 10 is a flowchart of the language selecting process by the program memory in still another embodiment of the present invention. FIG. 10 shows, because of some of the program memories being capable of selecting the languages, the process thereof.

(S31) At first, the language selecting process is chosen on the application program in the program memory 14. The processor 10 displays the setting screen as illustrated in FIG. 8A with an execution of the application program. This setting screen is a screen for selecting an operating environment such as [LANGUAGE SETTING], etc.

Herein, the cursor 181 is located at [LANGUAGE SETTING], and, when depressing the mode button 162, the language setting mode (language selecting process) is chosen.

(S32) With this processing, the CPU 10 reads the language data out of the language data storage memory 12. Simultaneously with this, the CPU 10 causes the display unit 18 to display the language section screen illustrated in FIG. 8B.

When the effective flag is set effective, on this screen wherein the above-mentioned read language data serves as a default value, the cursor 181 is initially displayed in a language position corresponding to this item of language data. Thus, the selected language data is displayed. Note that if the effective flag of the language data in the storage unit 12 is set ineffective, for example, English is set as the default value.

The user manipulates the direction indicating button 160 of the joy pad unit 16, thereby locating the cursor 181 in a desired language position. Then, when depressing the mode button 162, a desired language is chosen.

(S33) With this processing, the CPU 10 causes the storage unit 12 to store this selected language data and the effective flag.

Thus, the selecting operation of the language data by the program memory 14 is finished.

In this way, the language data is stored in a predetermined location, in a predetermined format, of the storage unit 12 for storing the language data. Then, when the language is selected by using all the programs, that item of data is read and set as a default value. Further, a selected result is stored in a predetermined location of the storage unit 12 in a predetermined format. Therefore, once the language is set, it follows that all the programs indicate messages in their languages.

This makes it possible to save the labor of taking the trouble to select the language each time the program is started. Further, the labor of selecting the language can be saved for every program.

In the embodiment discussed above, the application program has been described in the form of the game program. The present invention is not, however, confined to the game program but may be applicable to other application programs. The body unit 1 has been explained as a game device. The present invention is, however, applicable to other program operating apparatuses such as a personal computer, etc.

The present invention has been discussed so far by way of the embodiments. However, a variety of modifications can be carried out within the scope of the gist of the present invention but may not be excluded from the scope of the present invention.

As discussed above, according to the present invention, first, the storage unit 14 sold in areas exclusive of the sales areas of the body unit 1 is prevented from operating in that body unit 1. For this purpose, selling the storage unit 14 and the body unit 1 that were purchased in a certain sales area in other areas can be made meaningless. This makes it possible to prevent the injustice third party from obtaining the illegal profits. Thus, the profits of the developing company and of the sales company can be protected. Further, there is provided the check program as a part of the basic program of the body unit 1, and, therefore, the invalidation due to the analysis can be prevented.

What is claimed is:

1. A program operating apparatus for executing a program, comprising:

a body unit; and a memory unit, attachable and detachable from said body unit for storing an application program, and having a first sales area data including a first code indicating a sales area of said memory unit and second sales area data including a second code indicating the sales area of said memory unit, said body unit including:

storing means for storing third sales area data including a first code indicating the sales area of said body unit and fourth sales area data including a second code indicating the sales area of said body unit;

a non-volatile memory for storing a basic program; and a processor for first comparing the first code indicating the first sales area data of the memory unit with the first code indicating the third sales area data of the body unit, and for second comparing the second code indicating the second sales area data of the memory unit with second code indicating the fourth sales area data of the body unit, and determining whether or not the application program is executable in accordance with the results of the first comparing and the second comparing.

2. A program operating apparatus according to claim 1, further comprising a video generator for converting the data transmitted from said processor into video signals in accordance with the execution of the application program by said processor.

3. A program operating apparatus according to claim 1, wherein said processor, when resetting or switching ON a power supply, determines whether the application program is executable or not.

4. A program operating apparatus according to claim 1, wherein said memory unit stores an application program including plural items of message data in which messages having the same content are described in languages different from each other, said storing means of said body unit stores a selected language data, and said processor of said body unit executes the application program and, at the same time, when displaying a message within the execution of the application program, selects the message data in the language based on the language data of said storing means.

5. A program operating apparatus according to claim 4, further comprising input means for giving an indication to said processor, said processing causing said storing means to store the language data selected by an operation of said input means.

6. A program operating apparatus according to claim 1, wherein said memory unit stores a game program as the application program.

7. A program operating apparatus according to claim 6, further comprising a video generator for converting the data transmitted from said processor into video signals in accordance with the execution of the application program by said processor.

8. A program operating apparatus according to claim 7, wherein said memory unit stores an application program including plural items of message data in which messages having the same content are described in languages different from each other, said storing means of said body unit stores a selected language data, and said processor of said body unit executes the application program and, at the same time, when displaying a message within the execution of the application program, selects the message data in the language based on the language data of said storing means.

9. A program operating apparatus according to claim 8, further comprising input means for giving an indication to said processor, said processor causing said storing means to store the language data selected by an operation of said input means.

10. A program operating apparatus according to claim 6, wherein said processor, when resetting or switching ON a power supply, determines whether the application program is executable or not.

11. A program operating apparatus according to claim 6, wherein said memory unit stores an application program including plural items of message data in which messages having the same content are described in languages different from each other, said storing means of said body unit stores a selected language data, and said processor of said body unit executes the application program and, at the same time, when displaying a message within the execution of the application program, selects the message data in the language based on the language data of said storing means.

12. A program operating apparatus according to claim 11, further comprising input means for giving an indication to said processor, said processor causing said storing means to store the language data selected by an operation of said input means.

13. An apparatus for processing application data, comprising:

a body unit; and a memory unit, attachable and detachable from said body unit for storing application data by said body unit, including first sales area data including a first code indicating a sales area of said memory unit and second sales area data including a second code indicating the sales area of said memory unit;

said body unit comprising:

storing means for storing third sales area data including a first code indicating a sales area of said body unit and fourth sales area data including a second code indicating the sales area of said body unit; and a processor for first comparing the first sales area data with the third area data and second comparing the second sales area data with the fourth area data, and determining whether or not the application data is to be processed in accordance with results of the first comparing and the second comparing.

14. An apparatus for processing data of a memory unit attachable to and detachable from said apparatus, the memory unit having a first sales area data and a second sales area data comprising:

storing means for storing third sales data indicating a sales area of said apparatus and fourth sales area data indicating the sales area of said apparatus; and a processor for first comparing the first sales area data of said memory unit with the third sales area data of said storing means, and second comparing the second sales area data of said memory unit with the fourth sales area data of said storing means, and determining whether or not the data of said memory unit is processed in accordance with results of the first comparing procedure and the second comparing procedure.

15. A program operating apparatus for controlling the execution of a program, the apparatus comprising:

a memory unit for storing an application program and for storing first sales area data including a first code associated with the memory unit for defining a geographical sales area data, and further including a second code associated with the memory unit for defining the geographical sales area; and a body unit comprising:

storing means for storing third sales area data including a first code associated with the body unit for defining a geographical sales area and fourth sales area data including a second code associated with the body unit for defining the geographical sales area; and a processor for first comparing the first code of the first sales area data with the first code of the third sales area data, and second comparing the second code of the second sales area data with the second code of the fourth sales area data, and determining whether or not the application program is executable in accordance with results of the first comparing and the second comparing:

wherein the memory unit removably attaches to the body unit.

16. The program operating apparatus of claim 15, wherein the first and second codes each comprise a plurality of coded sales data.

17. The program operating apparatus of claim 16, wherein the body unit further comprises a control program, wherein the processor means executes the control program to compare the plurality of coded data of the first and second sales area codes in order to determine whether the application program is executable.

18. The program operating apparatus of claim 15, wherein the body unit further comprises a control program which is executed by the processor means in order to compare the first and second sales area codes.

* * * * *